United States Patent [19]

Curto et al.

[11] Patent Number: 5,459,285
[45] Date of Patent: Oct. 17, 1995

[54] METHOD AND APPARATUS FOR WATERBLOCKING SPLICES IN TRANSMISSION CABLES

[75] Inventors: Rick A. Curto, Friendswood; Danny T. Moore, Houston, both of Tex.

[73] Assignee: Western Atlas International, Inc., Houston, Tex.

[21] Appl. No.: 189,807

[22] Filed: Feb. 1, 1994

[51] Int. Cl.$^6$ ............................ H02G 15/18; H01R 43/00
[52] U.S. Cl. ............... 174/88 R; 174/19; 174/20; 174/77 R; 174/DIG. 8
[58] Field of Search ............ 174/88 R, DIG. 8, 174/93, 77 R, 20, 19

[56] References Cited

U.S. PATENT DOCUMENTS

| | | | |
|---|---|---|---|
| 2,958,722 | 11/1960 | Rubin et al. | 156/49 |
| 4,343,844 | 8/1982 | Thayer et al. | 428/36 |
| 4,450,318 | 5/1984 | Scardina et al. | 174/84 R |
| 4,467,002 | 8/1984 | Crofts | 174/74 A |
| 4,774,383 | 9/1988 | Dalton, Jr. | 174/50 |
| 5,055,636 | 10/1991 | Jaycox | 174/87 |
| 5,183,966 | 2/1993 | Hurtado et al. | 174/77 R |

FOREIGN PATENT DOCUMENTS

| | | | |
|---|---|---|---|
| 760959 | 1/1955 | United Kingdom | 174/77 R |
| 1270732 | 4/1972 | United Kingdom | 174/93 |

*Primary Examiner*—Morris H. Nimmo
*Attorney, Agent, or Firm*—Elizabeth W. Layman

[57] ABSTRACT

This invention discloses a method and apparatus for waterblocking wire-to-wire connections in a cable using an arrangement of seals. Lead-in transmission lines are slid through a multiple-aperture seal to produce a compression seal between the transmission lines and the seal and the trailing transmission line is slid through a single-aperture seal to produce another compression seal. A piece of constrictive tubing is slid over the first seal before splicing the wires in the lead-in and trailing transmission lines together. The tubing then is positioned over both seals to produce a compression seal between the tubing and the seals to form a waterblock in the area defined by the two seals containing the splice.

7 Claims, 2 Drawing Sheets

//]: #

METHOD AND APPARATUS FOR WATERBLOCKING SPLICES IN TRANSMISSION CABLES

BACKGROUND OF THE INVENTION

1. Field of the Invention

This invention relates generally to the field of transmission cables and more particularly to a method and apparatus for waterblocking splices in conductors contained within transmission cables.

2. Description of the Related Art

In marine exploration, an acoustic signal is generated in the water by a seismic source. The signal propagates through the water in the form of a wavefront which encounters the marine subsurface. The wavefront is refracted and part is reflected back from the bottom surface and from substrata towards the water's surface and detected by marine sensors such as hydrophones.

A series of hydrophones usually are encased in a seismic streamer (cable) and towed behind a vessel. The seismic streamer contains insulated electrical wires (conductors) which carry the signals from the hydrophones to seismic recording equipment on the vessel to obtain geophysical information about the substrata. During manufacture of the seismic streamer containing conductors with parallel circuits, two conductive wires are connected (spliced) to form a single wire.

After the completion of a survey, the cable is retrieved from the water and stored on a reel until redeployed for the next survey. The deployment and retrieval operations sometimes cause breaks in the electrical wires within the cable. The break can be repaired by splicing the damaged wires within the cable and then resealing the cable.

When water invades the cable and contacts the conductive wires, the wires short the connection and/or corrode the conductive wires. Areas of the cable that are especially susceptible to water leaks are the areas adjacent to wire splices. Typical insulated wire-to-wire connections in seismic streamers are waterblocked with mastic-filled shrink tubing. Commercially available mastics do not bond to some types of insulation such as polytetrafluoroethylene (PTFE). Therefore, when water invades the area around the splice, the water sometimes seeps through the mastic to the wire.

As disclosed in U.S. Pat. No. 5,183,966, which is incorporated herein by reference, a standard pair of O-rings and shrink tubing can be used to waterblock a splice between two insulated wires. A problem arises, however, when a coupling is required between more than two wires such as joining two parallel circuits to form a single conductor. Constrictive tubing creates a better compression seal around a nearly circular surface than around other shaped surfaces.

A combination of two circular seals creates a figure-8 shape instead of a single, near-circular shape. Shrink tubing the figure-8 configuration, therefore, can leave voids between the seals and the tubing. This creates an area susceptible to water seepage which defeats the purpose of the waterblock.

The present invention addresses the above-noted problem and provides a method and apparatus for waterblocking the area around splices made on multiple conductors.

SUMMARY OF THE INVENTION

This invention is a method and apparatus which provides waterblocking a coupling point on wire-to-wire connections in transmission cables. Lead-in transmission lines, which are to be coupled, are slid through a multiple-aperture seal which is fitted snugly over the transmission lines to produce a compression seal between the transmission lines and the seal. The trailing transmission line is slid through a single-aperture seal to produce a compression seal between the trailing transmission line and the second seal. A piece of constrictive tubing then is slid over the first seal which holds the lead-in transmission lines. The wires in the lead-in and trailing transmission lines are then connected together by standard splicing methods such as soldering or crimping. The tubing then is positioned over both seals to produce a compression seal between the tubing and the seals. This method provides waterblocking in the area defined by the two seals which contains the splice.

Examples of the more important features of the invention thus have been summarized rather broadly in order that the detailed description that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which the like elements have been given like numerals and wherein.

DETAILED DESCRIPTION OF THE PREFERRED EMBODIMENT

Figure 1:
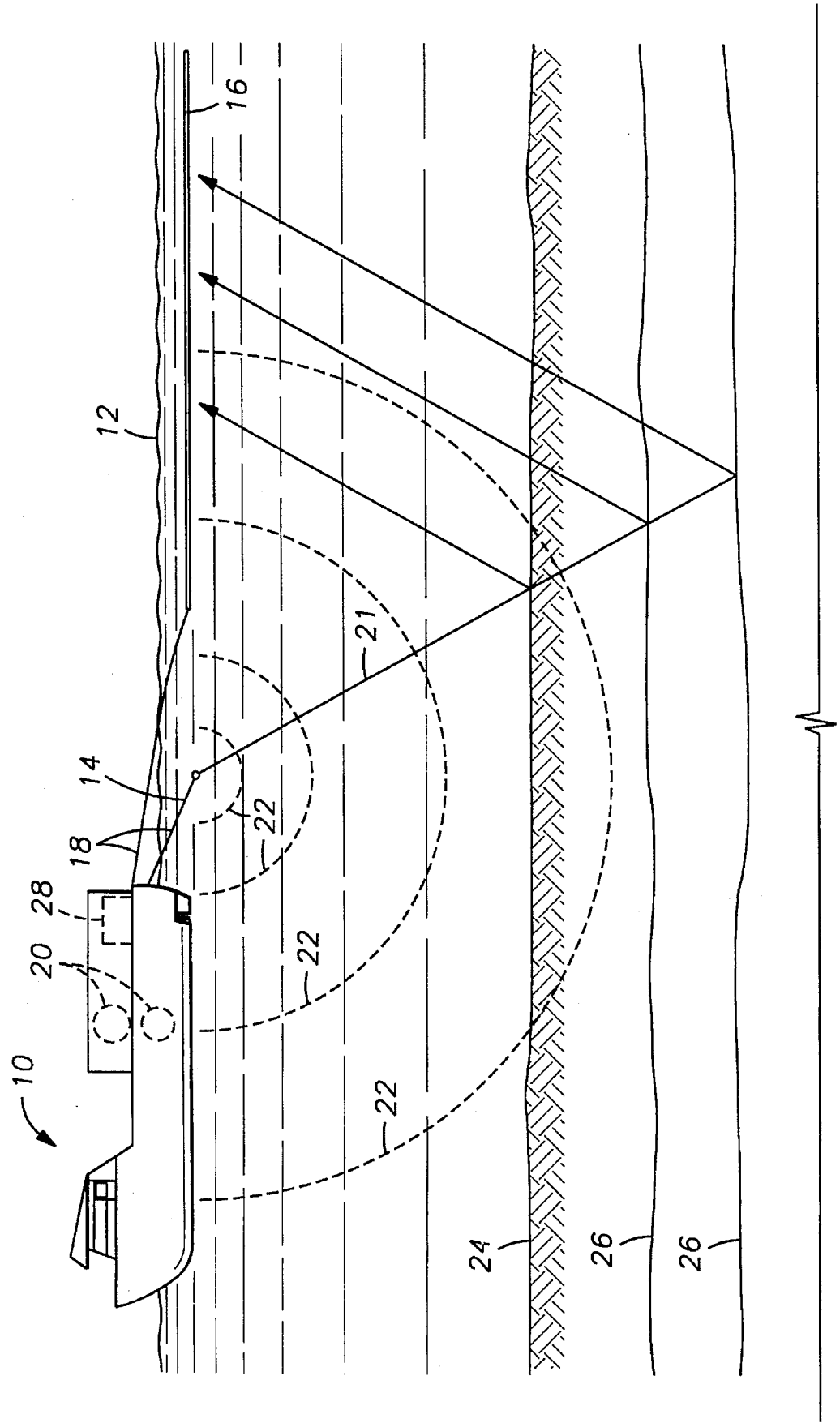
FIG. 1 shows a side elevation view of a vessel conducting a seismic survey in a body of water.

FIG. 1 shows a side elevation view of a vessel 10 conducting a seismic survey in a body of water 12. At least one acoustic source cable 14 and at least one streamer cable 16 extend behind the vessel 10. The acoustic source cable 14 and the streamer cable 16 are attached to the vessel 10 by lead-in cables 18 and are stored on reels 20 on the vessel 10.

During surveying operations, the vessel 10 tows the acoustic source cable 14 and the streamer cable 16 through the water 12 in a predetermined pattern. As the vessel 10 traverses the area being surveyed at a predetermined speed, the acoustic source in the acoustic source cable 14 is activated. An acoustic pulse 21 is generated and a wavefront 22 propagates downward through the water. The wavefront 22 is refracted by the bottom surface 24. Portions of the wavefront 22 reflect from the bottom surface 24 towards the streamer cable 16. Other portions of the wavefront 22 reflect from subsurface zones 26 upwards towards the streamer cable 16.

Seismic detectors, such as hydrophones (not shown), contained in the streamer cable 16 detect the reflected acoustic waves and generate optical and/or electrical signals representative of such acoustic waves. The streamer cable 16 contains a plurality of insulated conductors 30 (shown as 30a–c in FIG. 2) which relay the signals from the hydrophones through the streamer cable 16 to recording apparatus 28 onboard the vessel 10. The conductors 30a–c contain conductive wires 34a–c which are encased in insulation 32a–c, respectively.

Figure 2:
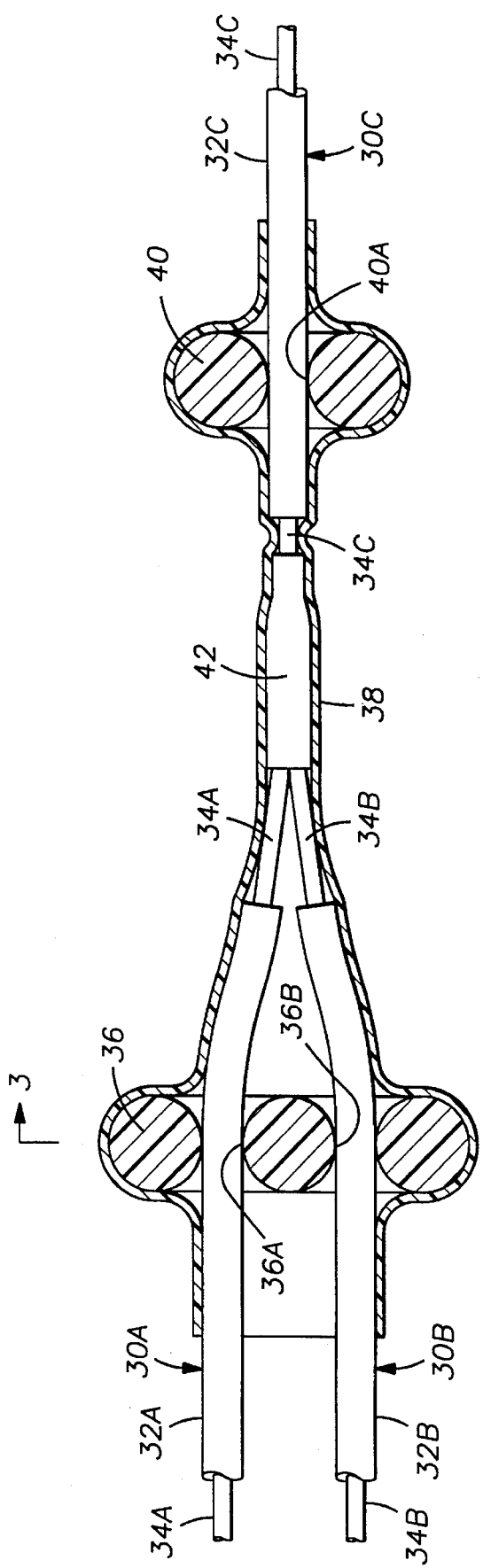
FIG. 2 shows a cross-sectional view of one embodiment of a waterblock contemplated by the present invention.

FIG. 2 illustrates one preferred embodiment produced by a method contemplated by the present invention to waterblock a coupling point 42 which connects conductors 30a and 30b to the conductor 30c using O-ring seals. O-rings are shown for example only and are not meant to exclude other configurations such as oval-shaped seals.

The lead-in portions, conductors 30a and 30b, are slipped through a top aperture 36a and a bottom aperture 36b, respectively, in a first O-ring 36 to form a compression seal between the first O-ring 36 and the insulation 32a and 32b of the conductors 30a and 30b. Similarly, the trailing portion, conductor 30c, is slipped through aperture 40a in a second O-ring 40 to form another compression seal.

A piece of constrictive tubing, such as shrink tubing 38, then is positioned over the first O-ring 36 containing the conductors 30a and 30b. The wires 34a and 34b of conductors 30a and 30b, respectively, then are connected to the wire 34c of conductor 30c at the coupling point 42 using standard splicing techniques such as soldering or crimping. The tubing 38 then is positioned to extend over both O-rings 36 and 40 and shrunk into position producing a compression seal between the tubing 38 and O-rings 36 and 40. Constrictive tubing is shown for example only and is not meant to exclude other sealing means. Similarly, shrink tubing is only one example of types of constrictive tubing that can be used. Other tubing such as rubber tubing (not shown) can also be used.

Figure 3:
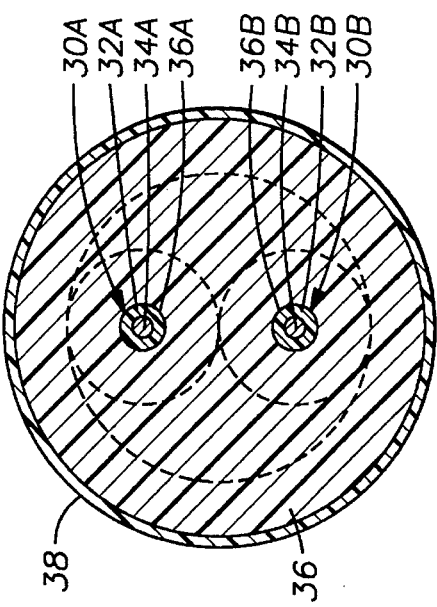
FIG. 3 shows a cross-sectional view of a multiple-aperture seal.

FIG. 3 shows a cross-sectional view of the first O-ring 36 encased in shrink tubing 38 and compression-sealed with conductors 30a and 30b in top aperture 36a and bottom aperture 36b, respectively.

An alternative embodiment (not shown) of the invention utilizes a pair of multiple-aperture O-rings on conductors 30a and 30b and a pair of single-aperture O-rings on conductor 30c. This provides a redundancy in case there is a problem with the seal on one of the O-rings.

The foregoing description is directed to two preferred embodiments of the present invention for the purpose of illustration and explanation. It will be apparent, however, to one skilled in the art that many modifications and changes to the embodiments set forth above are possible without departing from the scope of the invention. It is intended that the following claims be interpreted to embrace all such modifications and changes.

We claim:

1. An apparatus for sealing the coupling point between at least two lead-in transmission lines and a trailing transmission line, comprising:

(a) a first seal having a non-communicating aperture for each said lead-in transmission line and adapted to concentrically receive each said lead-in transmission line;

(b) a second seal having a single aperture and adapted to concentrically receive said trailing transmission line; and (c) sealing means placed over and extending between said first and second seals to encase said coupling point for preventing the migration of fluid to said coupling point.

2. The apparatus of claim 1, wherein said sealing means comprises a constrictive tubing.

3. The apparatus of claim 2, wherein said constrictive tubing comprises a shrink tubing.

4. The apparatus of claim 1, wherein said first and second seals are O-rings.

5. A method for sealing the coupling point between at least two lead-in transmission lines and a trailing transmission line, each said lead-in and trailing transmission lines having an insulating sheath over a conductor, comprising the steps of:

(a) removing a portion of the insulating sheaths of each said lead-in and trailing transmission line to expose said conductors;

(b) positioning a first seal on each said lead-in transmission lines, said first seal having a non-communicating aperture for each said lead-in transmission line and adapted to concentrically receive each said lead-in transmission line;

(c) positioning a second seal on said trailing transmission line, said second seal having an aperture adapted to concentrically receive said trailing transmission line;

(d) placing a sealing means about either said first or second seal, the length of said sealing means sufficient to extend over said other seal when said transmission lines are coupled;

(e) coupling said conductors of said lead-in and trailing transmission lines forming said coupling point; and (f) sliding said sealing means over said coupling point and said other seal to encase said coupling point for preventing the migration of fluid to said coupling.

6. The method of claim 5, wherein said first and second seals are O-rings.

7. The method of claim 5, wherein said sealing means is a constrictive tubing.

\* \* \* \* \*